US011890623B2

(12) United States Patent
Cherubini et al.

(10) Patent No.: US 11,890,623 B2
(45) Date of Patent: Feb. 6, 2024

(54) BUCKET INSERT FOR USE IN A CENTRIFUGE

(71) Applicant: Roche Diagnostics Operations, Inc., Indianapolis, IN (US)

(72) Inventors: Claudio Cherubini, Cham (CH); Andreas Drechsler, Baar (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 359 days.

(21) Appl. No.: 16/953,868

(22) Filed: Nov. 20, 2020

(65) Prior Publication Data

US 2021/0154684 A1 May 27, 2021

(30) Foreign Application Priority Data

Nov. 22, 2019 (EP) .................................... 19211030

(51) Int. Cl.
*B04B 7/12* (2006.01)
*B04B 5/04* (2006.01)

(52) U.S. Cl.
CPC .............. *B04B 7/12* (2013.01); *B04B 5/0421* (2013.01)

(58) Field of Classification Search
CPC . B04B 7/12; B04B 5/0421; B04B 2005/0435; B01L 2200/022; B01L 2200/087; B01L 2200/12; B01L 2200/141; B01L 2300/123; B01L 9/06; B01L 9/54
See application file for complete search history.

(56) References Cited

U.S. PATENT DOCUMENTS 4,057,148 A * 11/1977 Meyer ........................ B01L 9/06 211/74
4,670,004 A 6/1987 Sharple et al.
9,731,301 B2 8/2017 Sato et al.
9,757,739 B2 9/2017 Sato et al.
2010/0298108 A1* 11/2010 Sherman ................... B01L 9/06 494/20
2013/0199298 A1* 8/2013 Vivek ................... B04B 5/0421 73/632
2016/0214118 A1 7/2016 Sato et al.
2016/0310966 A1 10/2016 Henne et al.

FOREIGN PATENT DOCUMENTS

EP 1129783 B1 8/2006
EP 1369179 B1 9/2006
WO 2007/039523 A1 4/2007

OTHER PUBLICATIONS

European Search Report dated Feb. 24, 2020, in Application No. EP19211030, 2 pp.

* cited by examiner

*Primary Examiner* — Walter D. Griffin
*Assistant Examiner* — Shuyi S. Liu
(74) *Attorney, Agent, or Firm* — Woodard, Emhardt, Henry, Reeves & Wagner, LLP

(57) ABSTRACT

A bucket insert for use in a centrifuge is disclosed. The bucket insert comprises an insert body, the insert body comprising a plurality of elongated receptacles for receiving elongated sample vessels. The bucket insert is configured for orienting the elongated sample vessels in a tilted orientation. In the tilted orientation, at least some of the elongated sample vessels are oriented in a non-parallel fashion.

12 Claims, 9 Drawing Sheets

BUCKET INSERT FOR USE IN A CENTRIFUGE

CROSS-REFERENCE TO RELATED APPLICATIONS

This application claims priority to EP 19211030.2, filed Nov. 22, 2019, which is hereby incorporated by reference.

BACKGROUND

The present disclosure generally relates to a bucket insert, a bucket insert kit and to a bucket kit for use in a centrifuge. The present disclosure further relates to a centrifuge and to a method of centrifuging. The devices and the method according to the present disclosure specifically may be used in the field of high-throughput sample preparation and sample analysis, such as in the field of automated diagnostic sample handling. Other fields of application, however, are feasible, too, such as in the field of biological processing, e.g., for preparing and processing biological samples.

Amongst many other sample preparation techniques, centrifuging is an important technology for sample preparation, such as in the field of medical technology, diagnostics, biology or chemistry. Over the recent years, high-throughput handling of samples has gained importance, such as for high-throughput diagnostics or screening.

In automated systems, high capacity centrifuges are typically used to ensure high throughput of sample processing. Therein, usually, buckets are used for sample holding, wherein the buckets are connected to a rotor. In some cases, samples are loaded into the buckets or bucket inserts outside the centrifuge. The bucket or bucket insert typically provides for a rigid structure for positioning the sample tubes. The loading may take place in an automated fashion. After the sample tubes are loaded into the bucket or bucket inserts, the buckets with the sample tubes disposed therein are subject to the centrifuging process. During centrifuging process, the buckets are typically able to swing out of the centrifuge rotor.

Despite the advantages of the known methods and devices, several technical challenges remain. Thus, by the centrifuging process, a phase separation and/or a separation of media having different densities takes place. This separation, however, often is insufficient or shows the unwanted effect of a blurred or even tilted phase separation level. This insufficient or unsatisfactory phase separation may have several detrimental consequences. Thus, in particular in automated systems, the usable sample volume of the separated sample aliquots may be reduced, since the separation line within the sample tubes is blurred or tilted. Further, an automated detection of the separation interface, such as by laser liquid level detection, e.g., laser based liquid level detection and/or camera based liquid level detection, is impeded, which typically is compensated by using higher safety tolerances and, thus again, reduces the amount of separated sample which is actually usable. Further, specifically for quantitative preparations or measurements, the blurred separation interface leads to the detrimental effect that an exact volume determination is challenging or even impossible, specifically in automated systems. Finally, the improper phase separation may even lead to instability of the separation medium.

Therefore, there is a need for devices and methods that improve the separation and the localization of the separation interface and which at least partially avoid blurring or tilting of the separation interface in samples treated by centrifuging, specifically in automated systems.

SUMMARY

According to the present disclosure, a bucket insert for use in a centrifuge is presented. The bucket insert can comprise an insert body. The insert body can comprise a plurality of elongated receptacles for receiving elongated sample vessels. The bucket insert can be configured for orienting the elongated sample vessels in a tilted orientation. In the tilted orientation, at least some of the elongated sample vessels can be oriented in a non-parallel fashion. The bucket insert can be configured for orienting the elongated sample vessels in a substantially parallel orientation. In the substantially parallel orientation, the elongated sample vessels can be oriented in a substantially parallel fashion. The bucket insert can be at least partially flexibly deformable. The bucket insert can be configured for re-orienting the elongated sample vessels from the tilted orientation into the substantially parallel orientation and/or vice versa by deformation of the insert body.

Accordingly, it is a feature of the embodiments of the present disclosure to provide for devices and methods, which improve the separation and the localization of the separation interface and which at least partially avoid blurring or tilting of the separation interface in samples treated by centrifuging, specifically in automated systems. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
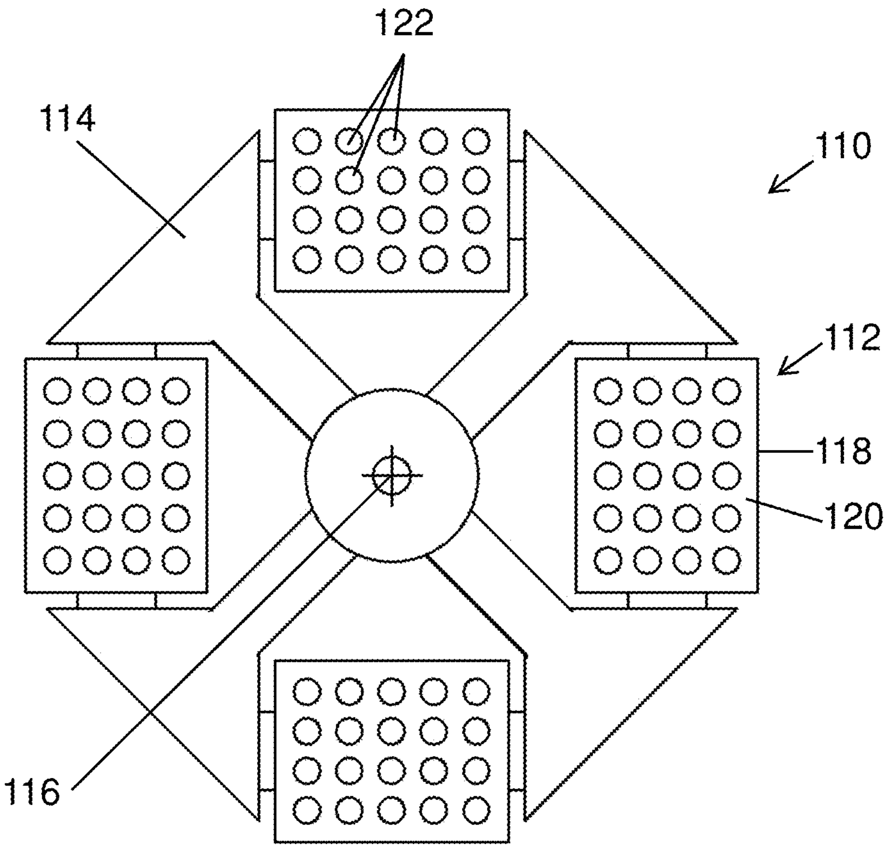
FIGS. 1A-B illustrate a centrifuge in a top view (FIG. 1A) and in a partial side view (FIG. 1B) according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof can be used in a non-exclusive way. Thus, these terms may both refer to a situation in which, besides the feature introduced by these terms, no further features can be present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms can be used in conjunction with optional features, without restricting alternative possibilities. Thus, features introduced by these terms can be optional features and may not be intended to restrict the scope of the claims in any way. The invention may, as the skilled person will recognize, be performed by using alternative features. Similarly, features introduced by "in an embodiment of the invention" or similar expressions can be intended to be optional features, without any restriction regarding alternative embodiments of the invention, without any restrictions regarding the scope of the invention and without any restriction regarding the possibility of combining the features introduced in such a way with other optional or non-optional features of the invention.

A bucket insert for use in a centrifuge is disclosed. The bucket insert can comprise an insert body. The insert body can comprise a plurality of elongated receptacles for receiving elongated sample vessels. The bucket insert can be configured for orienting the elongated sample vessels in a tilted orientation. In the tilted orientation, at least some of the elongated sample vessels can be oriented in a non-parallel fashion.

The term "centrifuge" as used herein can be a broad term and can be given its ordinary and customary meaning to a person of ordinary skill in the art and may not be limited to a special or customized meaning. The term specifically may refer, without limitation, to a device, which can be configured for subjecting at least one sample to a centrifugal force. The centrifuge specifically may be configured for separating two or more components of the sample by the centrifugal force. The centrifuge specifically may comprise at least one rotor such as at least one device configured for rotating the sample, and, further, at least one holder for holding the at least one sample, also referred to as a "bucket".

Consequently, the term "bucket" as used herein can be a broad term and can be given its ordinary and customary meaning to a person of ordinary skill in the art and may not be limited to a special or customized meaning. The term specifically may refer, without limitation, to a component of a centrifuge, which can be configured for holding the samples during the process of centrifuging. The bucket, as an example, in the centrifuge, may directly or indirectly be connected to the rotor, in a releasable fashion or fixedly. As an example and as will be outlined in further detail below, the bucket may comprise at least one frame and/or at least one body, into which the sample, directly or indirectly, may be inserted. The bucket specifically may be connected to the rotor in a tiltable or pivotable fashion, thereby, as an example, being capable of changing the orientation in accordance with a rotational speed. The bucket specifically may remain connected to the rotor, whereas, as will be outlined in further detail below, one or more bucket inserts may be used for loading the samples into the bucket and/or unloading the samples from the bucket.

Thus, the term "bucket insert" as used herein can be a broad term and can be given its ordinary and customary meaning to a person of ordinary skill in the art and may not be limited to a special or customized meaning. The term specifically may refer, without limitation, to a device or a component which can be configured for receiving the one or more samples. The bucket insert may be separate from the bucket and/or may fully or partially be integrated into the bucket. Specifically, the bucket insert may be configured for being inserted into the bucket, specifically reversibly. Thus, as will be outlined in further detail below, for loading the centrifuge with the at least one sample, the sample may be inserted into the bucket insert, wherein the insertion may take place outside the centrifuge, and, subsequently, the bucket insert may be inserted into the bucket. As an example, the bucket may comprise a bucket body having at least one opening and/or at least one cavity, wherein the bucket insert may be inserted into the opening and/or into the cavity and held by the bucket body. For unloading, such as after centrifuging, the bucket insert may be taken from the bucket, such as by taking out the bucket insert from the opening our cavity. Thus, the bucket insert, as an example, may be transferred between a loading and/or unloading station and the centrifuge. The bucket insert, thus, may enable automated use of the centrifuge, since the bucket insert specifically may be adapted for automated loading, such as by enabling simplified transport and/or handling.

The term "insert body" as used herein can be a broad term and can be given its ordinary and customary meaning to a person of ordinary skill in the art and may not be limited to a special or customized meaning. The term specifically may refer, without limitation, to at least one component providing mechanical stability to the bucket insert. Thus, as an example, the insert body may at least partially be made of a rigid material capable of providing sufficient mechanical strength for holding the elongated sample vessels. The insert body may comprise one or more components, such as one or more segments, as will be discussed in further detail below.

The term "elongated" as used herein can be a broad term and can be given its ordinary and customary meaning to a person of ordinary skill in the art and may not be limited to a special or customized meaning. The term specifically may refer, without limitation, to a shape and/or form of an arbitrary object, wherein an extension of the object along at least one axis of the object can exceed an extension of the object perpendicular to the axis of the object. The term elongated specifically may refer to a shape of the object, wherein in a Cartesian coordinate system, an extension of the object in a first axis of the Cartesian coordinate system, such as along an axis of the object, can exceed an extension of the object in at least one further axis of the Cartesian coordinate system, e.g., can exceed an extension of the object in both further axis of the Cartesian coordinate system. The term elongated may specifically refer to a form and/or shape of an element, wherein an extension along at least one first axis of the element can exceed an extension along at least one second axis of the element by at least a factor of 2, e.g., by a factor of about 2-10. In particular, the term elongated may be or may comprise an essentially cylindrical shape and/or form, such as a circular cylindrical shape and/or a polygonal cylindrical shape, e.g., a cuboid shape.

The term "receptacle" as used herein can be a broad term and can be given its ordinary and customary meaning to a person of ordinary skill in the art and may not be limited to a special or customized meaning. The term specifically may refer, without limitation, to an element, a combination of elements or a space configured for receiving one or more other elements. As an example, the receptacle may comprise one or more spaces, which fully or partially can be surrounded by one or more receptacle walls. Thus, the receptacle may fully or partially be surrounded by one or more walls of the insert body. Thus, the elongated receptacle specifically may comprise a bore having an essentially cylindrical shape, specifically a circular cylindrical shape and/or a polygonal cylindrical shape. Thus, the bore may have a cylindrical shape and/or a polygonal cylindrical shape, such as a rectangular shaped cross section, specifically a square shaped cross section. In addition to the bore having the essentially cylindrical shape, the elongated receptacle may further comprise one or more other sections, such as a widened front portion for receiving a lid of a sample tube and/or a rounded end portion for receiving a rounded end of a sample tube. Specifically, the bore may have an axis of extension or cylinder axis. An extension of the elongated receptacle along the cylinder axis may exceed an extension of the elongated receptacle substantially perpendicular to the cylinder axis, such as by at least a factor of 2, e.g., by a factor of about 2-10.

The term "elongated sample vessel" as used herein can be a broad term and can be given its ordinary and customary meaning to a person of ordinary skill in the art and may not be limited to a special or customized meaning. The term specifically may refer to a container configured for receiving one or more samples, the container having an elongated shape. The elongated sample vessel may specifically refer to a container having, at least in a portion, an essentially cylindrical, such as the shape of a cylinder, specifically a circular cylinder, and/or of a polygon, such as of a rectangle or even of a square. In addition to the at least one essentially cylindrical portion, the container may comprise one or more additional sections, such as a lid portion and/or an end portion, which not necessarily have to have the same shape as the essentially cylindrical portion. Thus, generally, the elongated sample vessel specifically may comprise a sample tube and/or a sample cuvette, such as a sample tube and/or cuvette made of glass and/or plastic material.

As outlined above, the bucket insert can be configured for orienting the elongated sample vessels in a tilted orientation, wherein in the tilted orientation at least some of the elongated sample vessels can be oriented in a non-parallel fashion. Thus, in the tilted orientation, at least two of the elongated sample vessels received and their respective elongated receptacles can be oriented in a nonparallel fashion, such that their respective axes, e.g., there cylinder axes, can be oriented in a nonparallel fashion, e.g., having an angle of more than about 2°, such as more than about 3° or even more than about 5° or more than about 10°. As an example, the bucket insert may comprise a plurality of elongated receptacles having openings, which, in a view on top of a front surface or upper surface of the bucket insert, may be arranged in the shape of a rectangular matrix. Therein, as will be shown in the exemplary embodiments below, in a first dimension of the rectangular matrix, neighboring receptacles may be oriented in a tilted fashion, such that the axes of neighboring receptacles in the direction of the first dimension can be tilted with respect to each other. In a second dimension, substantially perpendicular to the first dimension, however, neighboring receptacles may be oriented in a substantially parallel fashion, such that neighboring receptacles in the direction of the second dimension may not be tilted with respect to each other.

Consequently, for being configured for orienting the elongated sample vessels in the tilted orientation, the elongated receptacles may be oriented accordingly. The tilted orientation may be a configuration of the bucket insert or may be provided by a configuration of the bucket insert. The configuration of the bucket insert providing the tilted orientation may be the only configuration of the bucket insert. However, as will be outlined in further detail below, the bucket insert specifically may be configured for having at least two different configurations, wherein one of the configurations provides the tilted orientation and wherein another configuration of the bucket insert may provide for a different orientation, such as a non-tilted orientation in which the elongated sample vessels, specifically all of the elongated sample vessels, can be oriented in a substantially parallel fashion. Thus, consequently, the bucket insert may be configured for assuming at least two configurations, wherein in the at least two configurations, the orientation of the elongated sample vessels or of at least two of the elongated sample vessels, specifically an angle between axes of these elongated sample vessels, can change.

Specifically, in the tilted orientation, the elongated sample vessels may all be oriented towards a common rotational axis. Thus, a virtual axis in space may exist, which also may be referred to or which also may act as a rotational axis, wherein, at least within a predetermined range of tolerance, the axes of the elongated vessels and/or the axes of the elongated receptacles intersect with this virtual axis. Later on, when the bucket insert is mounted in the centrifuge, this virtual axis may be the rotational axis of the centrifuge. Consequently, the longitudinal extension of the elongated sample vessels may be oriented towards the rotational axis and, at least at high rotational speed, the direction of the centrifugal force may be substantially parallel to the axis of extension of the elongated sample vessels.

The insert body specifically may comprise an insertion surface. The term "insertion surface" as used herein can be a broad term and can be given its ordinary and customary meaning to a person of ordinary skill in the art and may not be limited to a special or customized meaning. The term specifically may refer, without limitation, to a surface of the insert body, which can be accessible for a user and/or a loading apparatus, for inserting the sample vessels into the receptacles. As an example, the insertion surface may be a flat or curved surface such as a top surface or upper surface of the insert body. The elongated receptacles, as outlined above, may comprise essentially cylindrical bores, wherein the essentially cylindrical bores may form openings in the insertion surface. Specifically, the essentially cylindrical bores may for example be or may comprise cubic bores, e.g., for inserting cuvettes. As outlined above, the elongated receptacle specifically may be arranged in a matrix pattern, wherein, consequently, the openings in the insertion surface may for also form the matrix pattern, such as a rectangular dot matrix pattern.

As outlined above, the bucket insert specifically may be configured for assuming at least two different configurations differing in the way the elongated receptacles are oriented. Thus, besides the first configuration in which the elongated receptacles and/or the elongated sample vessels are in the tilted orientation, the bucket insert, alternatively, may be brought into at least one second configuration, in which the elongated sample vessels and/or the elongated receptacles can be oriented in a substantially parallel orientation. Thus, generally, the bucket insert further may be configured for orienting the elongated sample vessels in a substantially parallel orientation, wherein in the substantially parallel orientation the elongated sample vessels can be oriented in a substantially parallel fashion. Thus, in other words, the axes of the elongated sample vessels and/or the elongated receptacles, in the substantially parallel orientation, can be oriented in a substantially parallel fashion, at least within a range of tolerance.

At least one part of the bucket insert, specifically at least one part of the insert body, may be configured for changing the configuration, such as by providing at least one hinge and/or by providing at least one deformable section. Thus, the bucket insert, such as the insert body, specifically may be at least partially deformable, specifically flexibly deformable. The bucket insert may be configured for re-orienting the elongated sample vessels from the tilted orientation into the substantially parallel orientation and/or vice versa by deformation of the insert body. Thus, the bucket insert may be configured for re-orienting the elongated sample vessels from the tilted orientation into the substantially parallel orientation by deformation of the insert body. Additionally or alternatively, the bucket insert may be configured for re-orienting the elongated sample vessels from the substantially parallel orientation into the tilted orientation by deformation of the insert body. Thus, as an example, a part of the insert body may be deformed such that the insert body changes its configuration, from a first configuration into a second configuration, wherein the first configuration may be or may comprise a configuration with the elongated sample vessels being oriented in the non-parallel fashion and wherein the second configuration may be or may comprise a configuration with the elongated sample vessels being oriented in the substantially parallel fashion or vice versa.

The insert body specifically may comprise a plurality of body segments. Thus, as an example, the insert body may comprise one body segment for each of the elongated receptacles. As an example, the body segments may each comprise a frame, such as a prismatic frame, e.g., a prismatic frame made of a plastic material such as a solid plastic material, wherein the elongated receptacle can be located within the frame. As an example, the body segment may comprise a prismatic block of plastic material, wherein, from one side, a cylindrical bore can be inserted into the block of plastic material. Other embodiments of the body segments, however, can be feasible, too. Each of the body segments may comprise at least one of the elongated receptacles, such as exactly one of the elongated receptacles. As outlined above, the body segment specifically may have an essentially prismatic shape.

The body segments specifically may be tiltable about at least one tilting axis. Thus, as an example, neighboring body segments may be tilted with respect to each other, such as by at least one hinge. Thus, at least two of the body segments may be tiltable with respect to each other. As an example, body segments may be arranged in at least one row, wherein neighboring segments in the row may be tiltable with respect to each other. Also, as outlined above, a rectangular matrix structure of the body segments may be given, wherein, as an example, neighboring segments in a row may be tiltable, whereas, in a second dimension, neighboring segments in a column may not be tiltable with respect to each other. The various geometric arrangements can be feasible. Thus, by the tilting, the matrix may be curved such that the segments can be oriented radially with respect to a virtual axis, such as the rotational axis.

The body segments may comprise a plurality of spacer openings for inserting at least one spacer element. The spacer element may be configured for holding the body segments in a tilted orientation. Thus, the configuration in which the body segments are in the tilted orientation may be maintained by the at least one spacer element. The at least one spacer element, as an example, may comprise a rigid body, which can engage with the plurality of spacer openings, in order to maintain the configuration in which the body segments are in the tilted orientation.

The insert body may comprise at least one connecting element, wherein the connecting element can connect the body segments. The at least one connecting element, as an example, may also provide for the deformable properties of the insert body and/or the bucket insert. Thus, as an example, the at least one connecting element may be deformable and/flexible and/or may provide for one or more hinges for tilting two or more of the body segments with respect to each other.

As an example, the connecting element may have a flat shape. Specifically, the connecting element may have a planar flat shape, at least in one configuration, such as in the substantially parallel configuration of the bucket insert. In particular, the connecting element may have a bent flat shape, at least in another configuration, such as in the tilted configuration of the bucket insert. As an example, the connecting element may be or may comprise a disk or a flat element, e.g., a flat element having a rectangular or polygonal shape and a constant thickness. The body segments may be attached to a surface of the connecting element, such as to a lower surface of the connecting element.

The term "flat shape" as used herein can be a broad term and can be given its ordinary and customary meaning to a person of ordinary skill in the art and may not be limited to a special or customized meaning. The term specifically may refer, without limitation, to a form of a three-dimensional object having a smooth and/or even surface. In particular, a flat shaped object may be a three dimensional object, wherein the object's extension in two dimensions can exceed the object's extension in the third dimension by at least a factor of 2, specifically by at least a factor of 3, more specifically by at least a factor of 5.

Specifically, the connecting element may have the planar flat shape in the case the elongated sample vessels are oriented in the substantially parallel orientation. In particular, the connecting element may have the bent flat shape in case the elongated sample vessels are oriented in the tilted fashion. As an example, the term "planar flat" may refer to a shape of an arbitrary flat object being evenly spread in one plane, such as having an evenly flat shape, wherein the term "bent flat shape" may refer to a shape of the same arbitrary flat object being bent in at least one dimension.

As an example, the connecting element may be deformable, specifically flexibly deformable, such as by using at least one flexible or deformable material, such as a plastic material such as a plastic sheet material. The connecting element may comprise a plurality of holes corresponding to the elongated receptacles. Thus, the insertion of the elongated sample vessels into the receptacles received within the body segments may take place through the holes and the connecting element. Further, the connecting element may comprise at least one hinge joint, wherein the at least one hinge joint may be configured for connecting the body segments. Specifically, the connecting element may comprise a plurality of hinge joints.

The bucket insert may fully or partially be made of at least one plastic material. As an example, the bucket insert, specifically the body segments of the bucket insert, may fully or partially be made of at least one thermoplastic material. Further, the at least one connecting element may also be made of at least one thermoplastic material.

A bucket insert kit for use in a centrifuge is disclosed. As used herein, the term "kit" specifically may refer to an assembly of at least two components, which may be handled independently, which, however, can be configured for interacting for fulfilling a common purpose. The bucket insert kit can comprise at least one bucket insert according to the present disclosure, such as according to any one of the embodiments disclosed above and/or according to any one of the embodiments disclosed in further detail below. Further, the bucket insert kit can comprise at least one spacer element, which can be configured for holding the bucket insert in a configuration in which the elongated sample vessels and/or the elongated receptacles can be oriented in the tilted orientation.

For possible definitions and options of the spacer element, reference may be made to the description of the bucket insert given above. As an example, the spacer element may comprise a base, such as a flat base, which may be inserted into a bucket of a centrifuge. Further, there may be a plurality of protrusions protruding from the base into an inner space of the bucket. The protrusions may be configured for engaging with the body segments of the bucket insert. As an example, the protrusions may protrude into openings within the body segments and/or into a space in between neighboring body segments. The protrusions, as an example, may have a conical shape, in order to maintain the tilted orientation. Examples will be given below.

A bucket kit for use in a centrifuge is disclosed. The bucket kit can comprise at least one bucket insert according to the present disclosure, such as according to any one of the embodiments disclosed above and/or according to any one of the embodiments disclosed in further detail below. The bucket kit can further comprise at least one bucket, wherein the bucket insert can be insertable into the bucket. The bucket kit may further comprise at least one spacer element, which can be insertable into the bucket or fixed in the bucket, specifically fixedly mounted in the bucket. The spacer element can be configured for holding the bucket insert within the bucket in a configuration in which the elongated sample vessels and/or the elongated receptacles can be oriented in the tilted orientation. For further possible definitions and options, reference may be made to the description of the bucket insert and the bucket insert kit above.

A centrifuge, also referred to as a centrifuge assembly, is disclosed. The centrifuge can comprise at least one bucket kit according to the present disclosure, such as according to any one of the embodiments disclosed above and/or according to any one of the embodiments disclosed in further detail below. Further, the centrifuge can comprise at least one rotor for rotating the bucket kit about at least one rotational axis. During rotation, specifically, the elongated sample vessels may be oriented towards the rotational axis, such that, e.g., axes, of the elongated sample vessels received in the elongated receptacles can intersect with the rotational axis.

The centrifuge specifically may be an automated centrifuge, having at least one actuator for automated handling of the plurality of the elongated sample vessels. Thus, specifically, the advantages of the present disclosure, such as option of changing the configuration of the bucket insert from a configuration in which the tilted orientation is given into a configuration in which the non-tilted orientation is given, may be used for the automated handling of the elongated sample vessels. Specifically, the non-tilted orientation may be used for sample loading and/or unloading, whereas the tilted orientation may be used for centrifuging.

A method of centrifuging is disclosed. The method can comprise the following method steps. The method steps specifically may be performed in the given order. It shall be noted, however, that a different order can also be possible. It is further noted that it can also be possible to perform two or more of the method steps simultaneously or in a timely overlapping fashion. Thus, as an example, at least steps d) and e) may be performed simultaneously or in a timely overlapping fashion. Further, one, more than one or even all of the method steps may be performed repeatedly. The method may comprise additional method steps, which may not be listed. The method specifically may also be computer-controlled, such as by automated loading and/or unloading and/or by automated centrifuging.

The method can comprises the following steps:

a. providing a plurality of elongated sample vessels;
b. providing at least one bucket insert according to the present disclosure, such as according to any one of the embodiments disclosed above and/or to any one of the embodiments disclosed in further detail below;
c. receiving the elongated sample vessels in the elongated receptacles;
d. orienting the bucket insert in the tilted orientation, wherein in the tilted orientation at least some of the elongated sample vessels are oriented in a non-parallel fashion;
e. receiving the bucket insert in at least one bucket of a centrifuge; and f. rotating the bucket about a rotational axis of the centrifuge, wherein the elongated sample vessels, during rotation, are axially oriented towards the rotational axis.

Specifically, as outlined above, the loading step, i.e. step c., may be performed in a substantially parallel orientation of the bucket insert, i.e., in a configuration of the bucket insert in which the elongated sample vessels and/or the elongated receptacles can be oriented in a substantially parallel fashion. Similarly, after centrifuging and performing step f., an unloading step may take place, in which also the configuration of the bucket insert in which the elongated sample vessels and/or the elongated receptacles can be oriented in a substantially parallel fashion is given. For the centrifuging, however, i.e., specifically for performing step f., the configuration in which the tilted orientation is given may be assumed. Thus, specifically, after performing step c. and before performing step f., the bucket insert may be re-oriented from the substantially parallel orientation into the tilted orientation, specifically the bucket insert may be re-orientated from a configuration in which the elongated sample vessels and/or the elongated receptacles can be oriented in the substantially parallel orientation into an orientation in which the elongated sample vessels and/or the elongated receptacles can be oriented in the tilted orientation. For this purpose, the method may further comprise receiving at least one spacer element in the bucket, wherein the spacer element can be configured for holding the bucket insert in the tilted orientation, specifically for holding the bucket insert in a configuration in which the elongated sample vessels and/or the elongated receptacles can be oriented in the tilted orientation.

As outlined above, one or more or even all of the method steps may be performed in an automated fashion, e.g., by using one or more robotic devices. As an example, step c. may be performed in an automated fashion. Further, a transfer from a loading station to the centrifuge and/or into the bucket may take place in an automated fashion, as well as a transfer, after centrifuging, from the bucket to an unloading station. Further, a change of the configuration of the bucket insert may also be performed automatically.

Finally, a use of the bucket insert according to the present disclosure is proposed. Thus, the present invention specifically may be applied in the field of automated sample processing, specifically of biological samples. Thus, as an example, the invention may be applied in the field of laboratory screening and/or diagnosis. Other applications are also possible, such as preparative applications, e.g., for sample preparation and/or manufacturing.

The devices and methods according to the present disclosure provide a large number of advantages over known devices and methods of similar kind. Thus, specifically, the above-mentioned challenges of improper phase separation may be avoided by using the bucket insert. By using the tilted orientation, it can generally be possible to design the bucket insert such that the elongated sample vessels can be oriented in such a way that the centrifugal force and/or a total force including the centrifugal force can be oriented substantially parallel to a longitudinal axis of the elongated sample vessel. Thereby, the at least one interface of separation of two or more components of the sample may typically be oriented substantially perpendicular to the axis of the elongated sample vessel. The sharpness of the interface of separation may be improved consequently. Further, by avoiding tilted or blurred interfaces, an automated detection of the separation interface may take place or may take place at a higher degree of confidence as compared to conventional methods and separation devices. Thus, the invention specifically may be applied in the field of automated processing of samples. Further, specifically for quantitative measurement or quantitative processes, by avoiding tilted or blurred interfaces, a more precise volume determination of the partial volumes separated by the centrifuging process may generally be possible. The partial volumes, since the interface typically is determinable in a more reliable manner, may also be used more efficiently, thereby generally avoiding losses of sample or components of the sample. Further, since the improper phase separation may widely be avoided or at least reduced, the stability of the separated samples may be increased.

During centrifuging, the bucket insert specifically may be in the configuration in which the elongated sample vessels are in the tilted orientation. Specifically, the elongated sample vessels may, in the tilted orientation, be oriented such that the centrifugal force vector, which may be congruent or parallel to a radius connecting the sample tube with the rotational axis, can be substantially parallel to the longitudinal axis of the elongated sample vessel. The bucket insert may be inserted into the bucket, wherein the bucket may be swingable, tiltable or pivotable about at least one axis.

As outlined above, the bucket insert may comprise a plurality of body segments. The body segments may be connected, e.g., by the at least one connecting element, in such a way that the body segments, at least partially, may be tilted in their relative position. Thus, as an example, one or more flexible elements may be used for interconnecting the plurality of body segments. Thereby, the body segments, including the elongated receptacles disposed therein, may be positioned, e.g., in the tilted orientation or in the substantially parallel orientation. The body segments may be kept in the respective positions by one or more holding elements, such as by the above-mentioned at least one spacer element.

The body segments also may be brought into the substantially parallel orientation for automated loading or unloading. After loading, e.g., during or after insertion of the insert into the bucket, the bucket insert may be brought into a configuration in which the tilted orientation can be given. Thereby, the tube axes of the elongated sample vessels may be oriented substantially parallel to the resulting force vector during centrifugation.

The at least one spacer element, as an example, may be rigid or may be flexible. Thus, the at least one spacer element may also have elastic properties. Further, additionally or alternatively, the at least one connecting element connecting the body segments may also have flexible properties, e.g., by keeping the bucket insert in the configuration in which the substantially parallel orientation can be given as long as the body segments are not forcibly spread and brought into the second configuration in which the tilted orientation can be given, e.g., by the spacer element. Thus, a spring force of the connecting element may maintain the configuration with a substantially parallel orientation, whereas, by overcoming this spring force of the connecting element, the bucket insert may be brought into the configuration with the tilted orientation, e.g., inside the bucket, e.g., by the spacer element.

In order to load the bucket insert, the bucket insert, as an example, may be inserted into a holder, wherein the substantially parallel orientation may be given. The loading, as an example, may take place automatically. After loading, the bucket insert may be spread and/or reconfigured, thereby bringing the bucket insert into the configuration in which the tilted orientation is given, e.g., simultaneously or before inserting the bucket insert into the bucket. In the bucket, the tilted orientation may be maintained by the at least one spacer element, which may also be integrated into the bucket itself. After centrifuging, the bucket insert may, again, be removed from the bucket and may be brought back into the substantially parallel orientation, e.g., by releasing the force maintaining the tilted orientation, thereby allowing the elastic force of the connecting element re-configuring the bucket insert and reestablishing the tilted orientation.

During centrifuging, the axes of the elongated sample vessels may be aligned with the centrifugal force vector, due to the tilted orientation. The tilted orientation, as outlined above, may be maintained by the at least one spacer element, which may be a separate space or element and/or a spacer element integrated into the bucket, e.g., into a bottom side of an opening of the bucket into which the bucket insert is inserted. Thereby, a desired precise spreading of the bucket insert may be maintained, e.g., during centrifuging.

Thus, a procedure for centrifuging might contain the following steps:

- bringing the bucket insert into the substantially parallel orientation, e.g., by the restoring spring force of the connecting element, which may be a flat spring, orienting the body segments in a substantially parallel fashion, wherein the bucket insert may be supported or held by a holding structure and/or a centrifuge deck;
- loading the elongated sample vessels into their respective receptacles, e.g., by using automated loading means such as a robot;
- inserting the bucket insert into the bucket, e.g., manually or automatically, wherein, as an example, before or during the insertion of the bucket insert into the bucket a reconfiguration from the substantially parallel orientation into the tilted orientation takes place, e.g., by using the spacer element, such that the tube axes of the elongated sample vessels can be aligned with the centrifugal force vector during centrifugation;
- centrifuging; and
- unloading the centrifuge by reversing the above-mentioned loading steps.

Thus, the at least one connecting element may be a spring which, in the substantially parallel orientation, can be relaxed. Other options, however, can be possible. Thus, as an example, the connecting element may also be relaxed, without exerting forces onto the body segments, when the bucket insert is in the configuration with the tilted orientation. Thus, the at least one connecting element may also be pre-bended. The connecting element may, thus, support the tilted orientation and, thus, the alignment of the axes of the elongated sample vessels with the centrifugal force vector. In this embodiment, the above-mentioned procedure may be modified as follows:

- for loading of elongated sample vessels, the bucket insert may be positioned on a support, such as on the centrifuge deck and/or may be inserted into a means which unspreads and aligns the body segments of the bucket insert, thereby orienting the bucket insert in the substantially parallel orientation;
- in the substantially parallel orientation, elongated sample vessels may be loaded, e.g., automatically, e.g., vertically into the bucket insert;
- the bucket insert may be loaded, e.g., automatically, into the bucket, wherein, before or during the loading, the re-configuration of the bucket insert into the configuration with the tilted orientation may take place, e.g., by the spring force of the connecting element and wherein an inner structure and/or the spacer element may support the alignment of the bucket insert inside the bucket;
- the centrifuging may take place within the centrifuge; and
- the above-mentioned steps may be reverted for unloading.

In this option, minor additional bending may be required for bringing the bucket insert into the tilted orientation for centrifuging.

Generally, by using the present disclosure, groups of many samples may be handled efficiently, as required e.g., in high throughput systems. Further, the valuable sample volume can be used very efficiently, which is particularly advantageous for very small sample volumes. Finally, it can be further possible to determine the exact position of the separation interface e.g., by using automated means, such as laser detection, thereby enabling, e.g., an automated and still precise volume determination of the volume or the partial volumes of the sample.

A bucket insert for use in a centrifuge is presented. The bucket insert can comprise an insert body. The insert body can comprise a plurality of elongated receptacles for receiving elongated sample vessels. The bucket insert can orient the elongated sample vessels in a tilted orientation. In the tilted orientation, at least some of the elongated sample vessels can be oriented in a non-parallel fashion. In the tilted orientation, the elongated sample vessels can be axially oriented towards a common rotational axis.

The insert body can comprises an insertion surface. The elongated receptacles can comprise essentially cylindrical bores in the insert body, e.g., cubic bores, the essentially cylindrical bores forming openings in the insertion surface.

The bucket insert can further orient the elongated sample vessels in a substantially parallel orientation. In the substantially parallel orientation, the elongated sample vessels can be oriented in a substantially parallel fashion.

The bucket insert, specifically the insert body, can be at least partially deformable such as, for example, flexibly deformable. The bucket insert can re-orient the elongated sample vessels from the tilted orientation into the substantially parallel orientation and/or vice versa by deformation of the insert body.

The insert body can comprise a plurality of body segments. Each body segment can comprise at least one of the elongated receptacles. The body segments can have an essentially prismatic shape. The body segments can be tiltable about at least one tilting axis such that at least two of the body segments can be tiltable with respect to each other. The body segments can comprise a plurality of spacer openings for inserting at least one spacer element. The spacer element can hold the body segments in a tilted orientation.

The insert body can comprise at least one connecting element. The connecting element can connect the body segments. The connecting element can have a flat shape such as, for example, a planar flat shape and/or a bent flat shape. The body segments can be attached to a surface of the connecting element.

The connecting element can have the planar flat shape when the elongated sample vessels are oriented in the substantially parallel orientation. The connecting element can have the bent flat shape when the elongated sample vessels are oriented in the tilted orientation. The connecting element can be deformable such as, for example, flexibly deformable. The connecting element can comprise a plurality of holes corresponding to the elongated receptacles. The connecting element can comprise at least one hinge joint configured for connecting the body segments.

The bucket insert can be made of at least one plastic material.

The elongated receptacles can be arranged in the insert body in a matrix pattern such as, for example, in a rectangular matrix pattern.

A bucket insert kit for use in a centrifuge is presented. The bucket insert kit can comprise at least one bucket insert according to any one of the preceding embodiments and at least one spacer element. The spacer element can hold the bucket insert in a configuration in which the elongated sample vessels and/or the elongated receptacles can be oriented in the tilted orientation.

A bucket kit for use in a centrifuge can further comprise at least one bucket. The bucket insert can be insert into the bucket.

The at least one spacer element can be inserted into the bucket or fixed in the bucket. The spacer element can hold the bucket insert within the bucket in a configuration in which the elongated sample vessels and/or the elongated receptacles can be oriented in the tilted orientation.

A centrifuge is presented. The centrifuge can comprise at least one bucket kit and at least one rotor for rotating the bucket kit about at least one rotational axis. The centrifuge can be an automated centrifuge having at least one actuator for automated handling of the plurality of the elongated sample vessels.

A method of centrifuging is presented. The method can comprise a. providing a plurality of elongated sample vessels;
b. providing at least one bucket insert;
c. receiving the elongated sample vessels in the elongated receptacles;
d. orienting the bucket insert in the tilted orientation, wherein in the tilted orientation at least some of the elongated sample vessels are oriented in a non-parallel fashion;
e. receiving the bucket insert in at least one bucket of a centrifuge; and
f. rotating the bucket about a rotational axis of the centrifuge, wherein the elongated sample vessels, during rotation, are axially oriented towards the rotational axis.

Step c. can be performed in a configuration of the bucket insert in which the elongated sample vessels and/or the elongated receptacles are oriented in a substantially parallel orientation. In the substantially parallel orientation, the elongated sample vessels are oriented in a substantially parallel fashion. Step c. can be performed in an automated fashion After performing step c. and before performing step f., the bucket insert can be re-oriented from the substantially parallel orientation into the tilted orientation.

The method can comprises receiving at least one spacer element in the bucket. The spacer element can holding the bucket insert in a configuration in which the elongated sample vessels and/or the elongated receptacles are oriented in the tilted orientation.

Figure 1B:
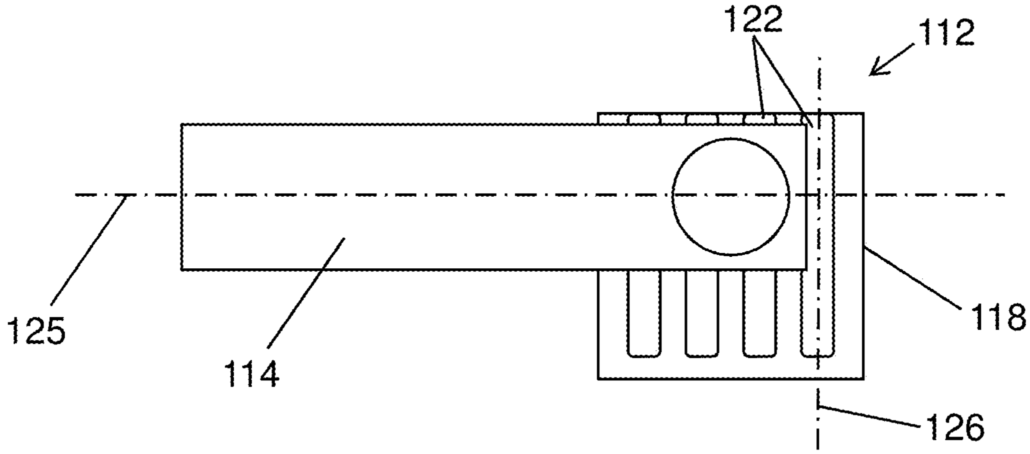

Referring initially to FIGS. 1A-B, in FIGS. 1A and 1B, an exemplary embodiment of a centrifuge 110 is shown in a top view (FIG. 1A) and in a partial side view (FIG. 1B). The centrifuge 110 specifically may be used in automated systems, since the centrifuge 110 can have a high capacity and may ensure a high throughput of sample processing. The centrifuge 110 can comprise, as an example, four bucket kits 112 and a rotor 114 configured for rotating the bucket kits 112 about a rotational axis 116.

Each bucket kit 112 can comprise a bucket 118 and at least one bucket insert 120. The bucket inserts 120 may be removable from their respective buckets 118 or, alternatively, may be fixedly mounted or integrated into the buckets 118. Each of the bucket inserts 120 can comprise a plurality of elongated receptacles 122, which, as an example, may be arranged in a rectangular matrix pattern. The elongated receptacles 122, in FIGS. 1A and 1B, may, with their respective axes 126, also referred to as their axes of extension or longitudinal axes, extend into the plane of projection in FIG. 1A and substantially parallel to the plane of projection in FIG. 1B. Further, the axes of the elongated receptacles 122 may extend, in the rest position of the centrifuge 110, essentially perpendicular to a radial direction 125. As visible e.g., in FIG. 1B, the buckets 118 may be pivotably suspended about the rotor 114.

Figure 2:
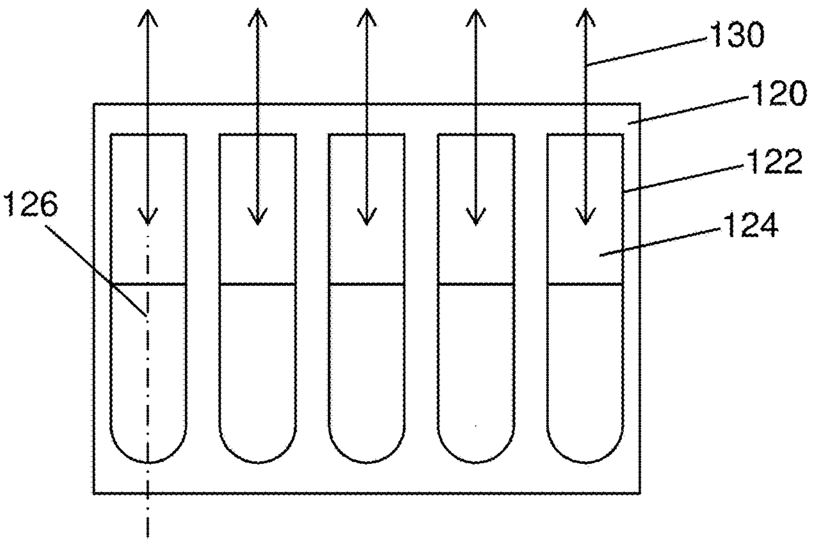
FIG. 2 illustrates a cross-sectional view of a bucket insert according to an embodiment of the present disclosure.

As shown exemplarily in a cross-sectional view in FIG. 2, a plurality of elongated sample vessels 124 may be loaded into the elongated receptacles 122, such that the longitudinal axes 126 of the elongated sample vessel 124 can align with the respective longitudinal axis 126 of the respective elongated receptacle 122 in which the elongated sample vessel 124 can be received.

Specifically for automated solutions and systems, elongated sample vessels 124 typically can be loaded into and unloaded from the bucket inserts 120 outside the centrifuge 110. For this purpose, either the bucket insert 120 or the full bucket kit 112 may be removed from the centrifuge 110, for loading or unloading, respectively. For the loading and/or unloading, one or more sample handling systems may be provided, such as a sample handling robot.

In known systems, the bucket inserts 120 typically are rigid structures. In these rigid structures, as indicated in FIG. 2, the elongated sample vessels 124 typically are loaded and/or unloaded, from the top, in a vertical direction, as indicated by the arrows 130. Thus, for all elongated receptacles 122, the loading/unloading directions 130 typically are parallel, in order to enable automated loading from the top. After sample loading, the bucket inserts 120 are loaded into the centrifuge 110, by loading the bucket inserts 120 into their respective buckets 110 and/or by mounting the complete bucket kits 112 to the centrifuge 110.

Figure 3A:
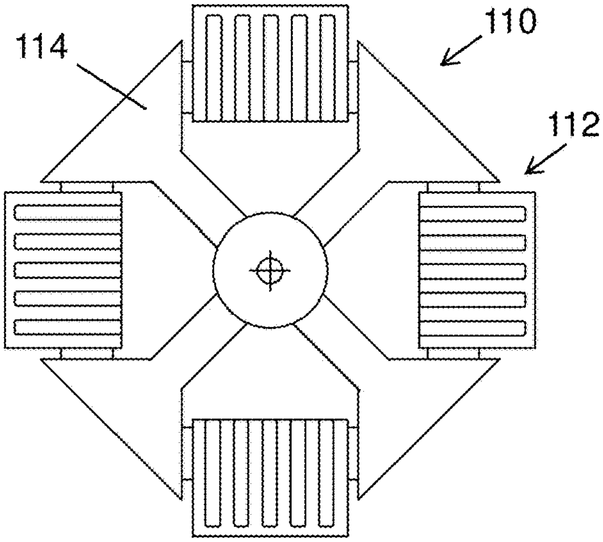
FIGS. 3A-B illustrate a centrifuge during rotation, in a top view (FIG. 3A) and in a partial side view (FIG. 3B) according to an embodiment of the present disclosure.
Figure 3B:
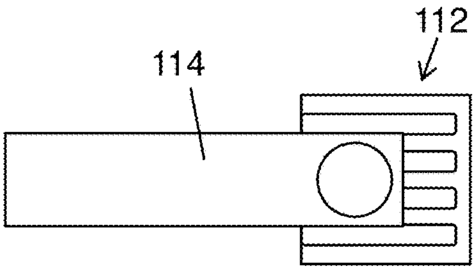
Figure 4:
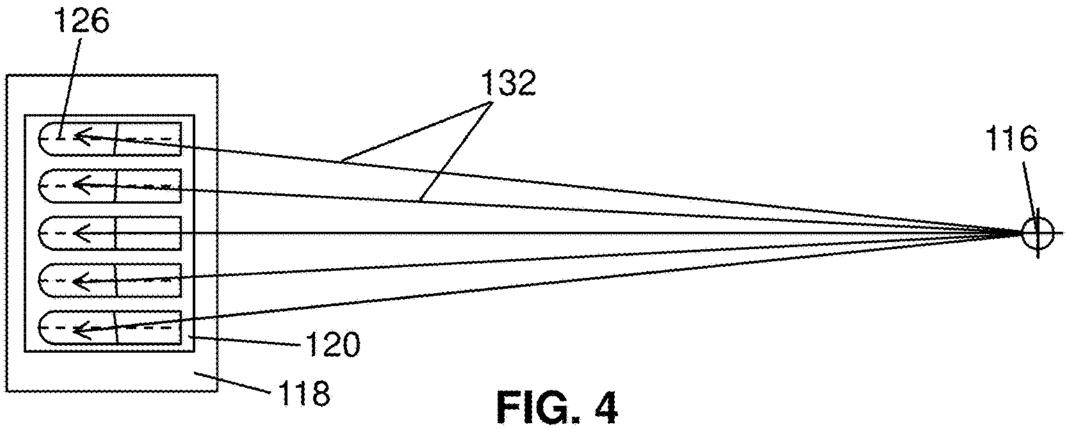
FIG. 4 illustrates a cross-sectional view from the top onto the conventional bucket insert of FIG. 2 during centrifugation according to an embodiment of the present disclosure.

During centrifugation, as shown in the top view of FIG. 3A and in the side view of FIG. 3B, the buckets 118 can swing out. This conventional arrangement of the elongated sample vessels 124 during centrifugation, however, implies that, specifically for elongated sample vessels 124 received in off-centered elongated receptacles 122, the longitudinal axes 126 of the elongated sample vessels 124 or the longitudinal axes 126 of the elongated receptacles 122 are not aligned with a respective centrifugal force vector which is congruent with the radius and which is denoted by reference number 132 in FIG. 4. This effect increases with the off-centering of the elongated receptacles 122 in the bucket insert 120. Off-centering specifically may refer to a configuration in which a distance exists between the longitudinal axes 126 of the elongated sample vessels 124 and/or of the elongated receptacles 122 and a center of rotation during centrifugation.

Figure 5:
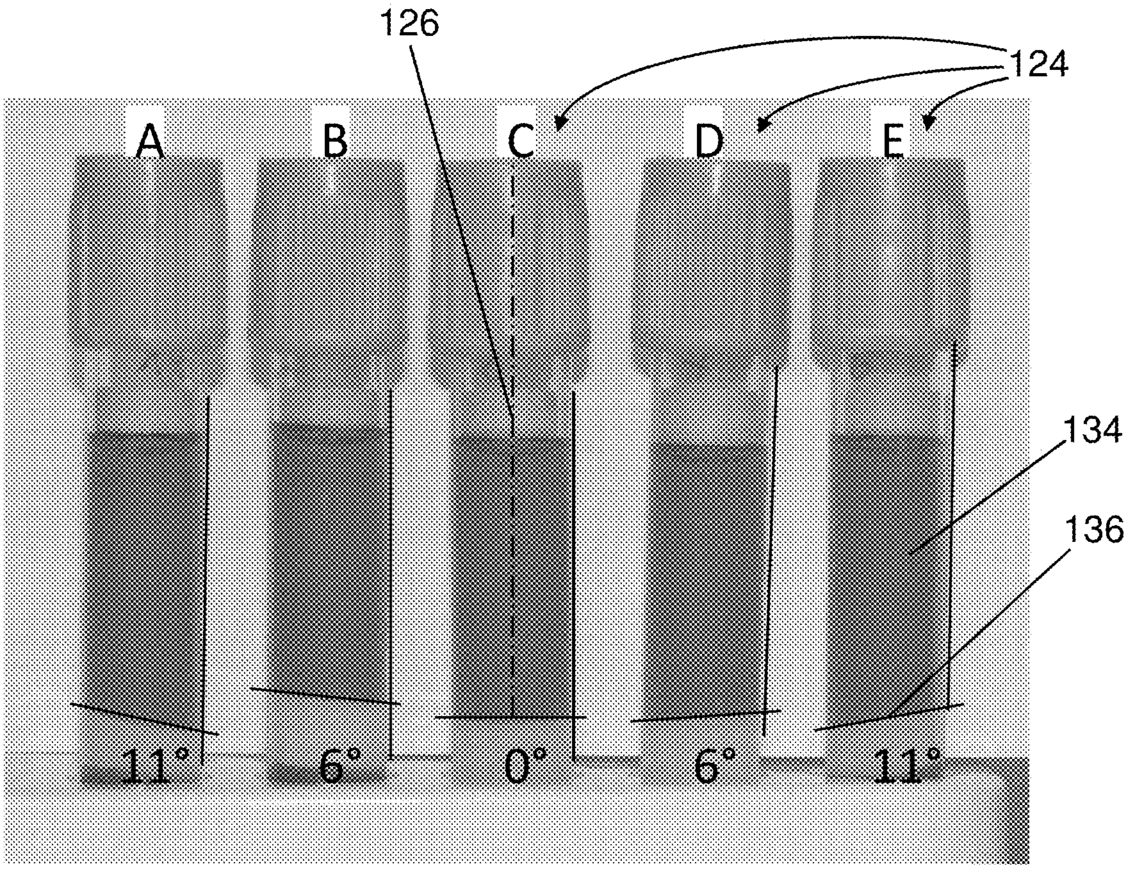
FIG. 5 illustrates five elongated sample vessels after centrifugation in the setup of FIG. 4 according to an embodiment of the present disclosure.

The effect of the vector misalignment can be shown experimentally as depicted in FIG. 5. Therein, five elongated sample vessels 124 are shown, filled with a two-component test sample 134 and, for example, a separation medium, after separation by the centrifuge 110. The elongated sample vessels 124 most left and right in FIG. 5, denoted by A and E, were positioned at the edge of the bucket insert 120 during centrifugation, whereas the elongated sample vessels

124 denoted by B and D were closer to the center and wherein the elongated sample vessel 124 denoted by C was centered. In this Figure, the separation interface can be seen, denoted by reference number 136. The angular numbers given for each of the elongated sample vessels 124 indicate a deviation of an angle between the respective longitudinal axis 126 of the elongated sample vessel 124 and the separation interface 136 from about 90°. It is clearly visible that the fact of the longitudinal axis 126 and the centrifugal force vector 132 not being aligned for the outer elongated sample vessels 124 causes an inclination of the separation interface 136. Consequences for sample processing, in particular in automated systems, may be, as outlined above, a reduction of the usable sample volume, difficulties in automated determining the separation interface 136, e.g., by laser liquid level detection, the necessity for applying an additional safety tolerance, difficulties in using automated systems in general and even the effect of a separation medium becoming instable.

Figure 6:
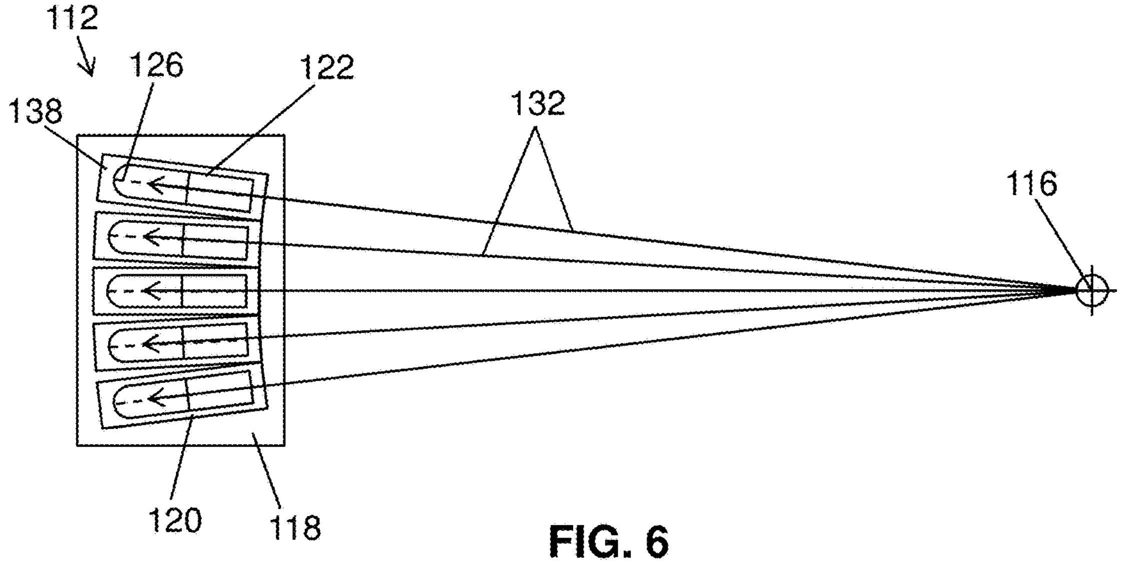
FIG. 6 illustrates a cross-sectional view from the top onto a bucket insert during centrifugation according to an embodiment of the present disclosure.

As proposed by the present disclosure and as schematically indicated in FIG. 6, this unsatisfactory situation may be avoided at least partially by the present disclosure. Thus, a bucket insert 120 can be used, having an insert body 138 comprising the plurality of elongated receptacles 122 for receiving the elongated sample vessels 124. The bucket insert 120 can have at least one configuration, as shown in FIG. 6, in which the elongated sample vessels 124 received in the elongated receptacles 122 can be oriented in a tilted orientation. In the tilted orientation, at least some of the elongated sample vessels 124 can be oriented in a non-parallel fashion. Specifically, in the tilted orientation, the longitudinal axes 126 of the elongated sample vessels 124 or the longitudinal axes 126 of the elongated receptacles 122 may be oriented towards the rotational axis 116. Thereby, as shown in FIG. 6, the longitudinal axes 126 may, at least essentially and within a range of tolerance of e.g., no more than about 10°, no more than about 5° or even no more than about 2°, be aligned with the centrifugal force vector 132. The above-mentioned problem as shown in FIG. 5 may, thus, at least partially be avoided.

Figure 7A:
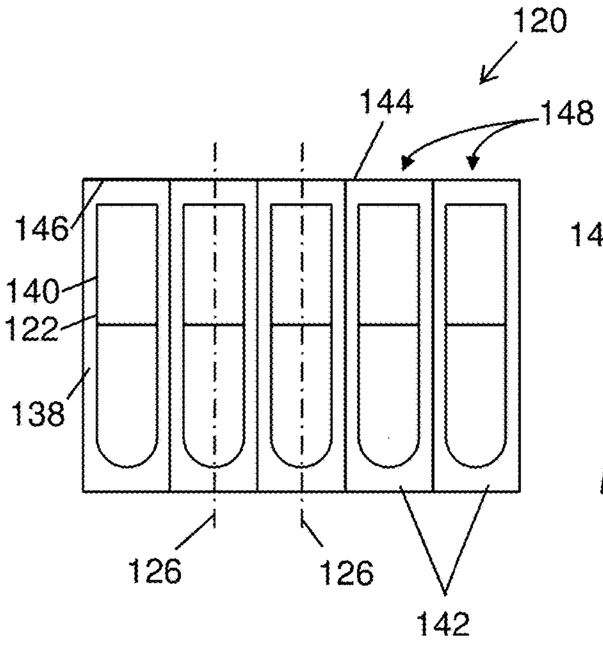
FIG. 7A-B illustrate a cross-sectional view of an embodiment of a bucket insert according to the present invention in a substantially parallel orientation (FIG. 7A) and in a non-parallel or tilted orientation (FIG. 7B) according to an embodiment of the present disclosure.
Figure 7B:
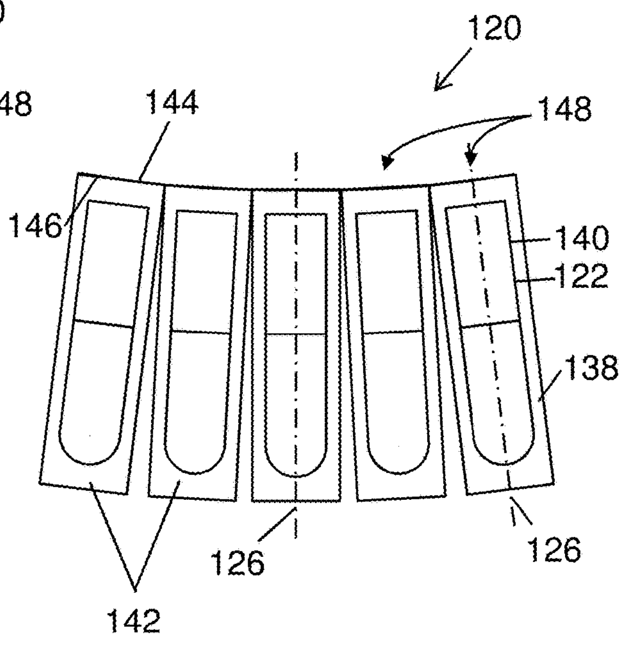

In FIGS. 7A and 7B, a cross-sectional view of the bucket insert 120 is shown. Therein, Fi. 7B shows a first configuration of the bucket insert 120, in which, as in FIG. 6, the elongated sample vessels 124 can be oriented in a non-parallel fashion, specifically with the longitudinal axes 126 oriented towards a common axis, which, in case the bucket insert 120 can be used in the centrifuge 110, may be the rotational axis 116. Besides the first configuration shown in FIG. 7B, one or more further configurations of the bucket inserts 120 may exist. Specifically, at least one second configuration may exist, as shown in FIG. 7A, in which the elongated sample vessels 124 can be oriented in an essentially parallel fashion, e.g., within the angular tolerances given above. The second configuration, as an example, may be used for loading and/or unloading of the elongated sample vessels 124, whereas the first configuration and the tilted orientation may be used for centrifuging.

For being able to bring the elongated sample vessels 124 into the non-parallel orientation, various options are feasible. Thus, specifically, the bucket insert 120 may be configured for changing its configuration. For this purpose, the bucket insert 120 may at least partially be made of a flexible material. Thus, as an example, the bucket insert 120 may comprise an insert body 138, as shown in FIGS. 7A and 7B, the insert body 138 comprising a plurality of essentially cylindrical bores 140 disposed therein, wherein the cylindrical bores 140 at least form part of the elongated receptacles 122. The insert body 138 may be configured such that the orientation of the cylindrical bores 140 and/or the elongated receptacles 122 against each other may be changed.

As an example, the insert body 138 may comprise a plurality of body segments 142 wherein, as an example, in each body segment 142 at least one of the elongated receptacles 122 and/or at least one of the cylindrical bores 140 may be disposed. The body segments 142, as an example, may have a lengthy shape, such as a prismatic shape, such as having rectangular bases and rectangular sidewalls. Other shapes, however, are also possible. The bucket insert 120 and/or the insert body 138 may be configured such that the body segments 142 may be tilted against each other or re-oriented against each other, in order to change from the first configuration into the second configuration or vice versa. For this purpose, the bucket insert 120 may comprise at least one connecting element 144 connecting the body segments 142. In the example shown in FIGS. 7A and 7B, the connecting element 144, as an example, may be made of a sheet-like material. The connecting element 144 specifically may be deformable such as, for example, flexibly deformable. Thus, as an example, the sheet-like material may be made of a material having spring properties, such as a plastic material or a metal sheet, such as a spring steel sheet. The body segments 142 may be connected to a lower surface 146 of the connecting element 144. The connecting element 144 may comprise a plurality of holes 148 corresponding to the elongated receptacles 122, such that the elongated receptacles 122 may be loaded through the connecting element 144.

Figure 8A:
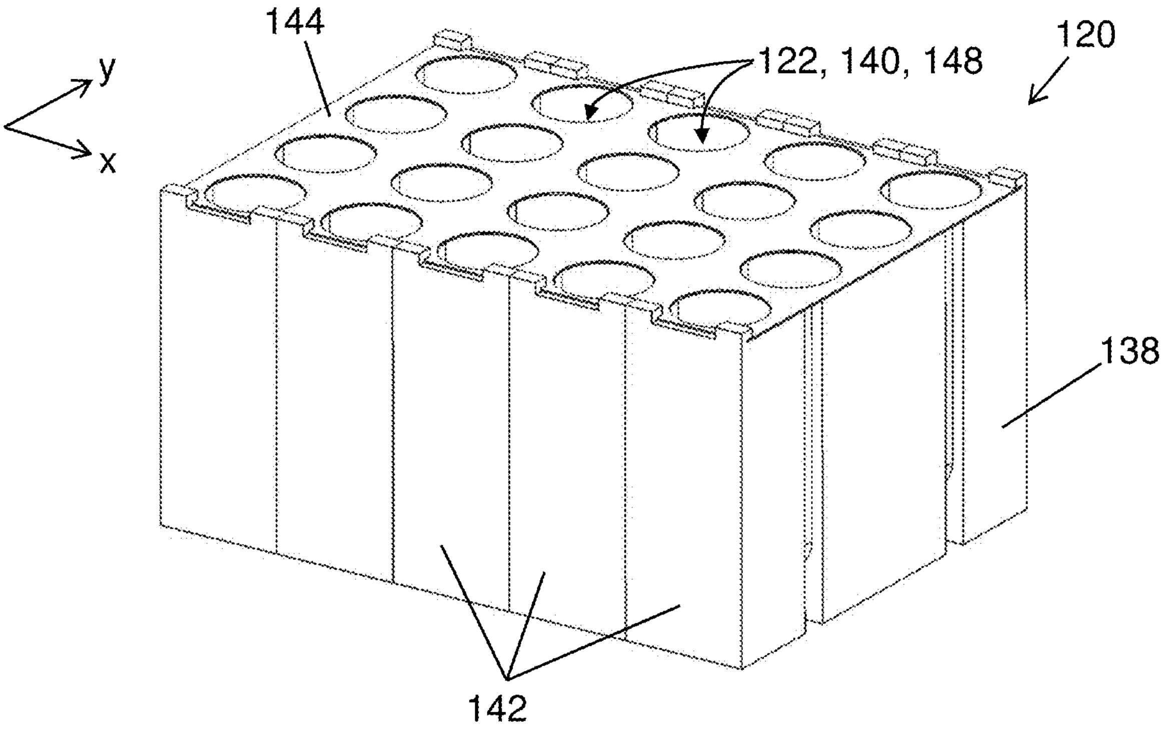
FIGS. 8A-B illustrate a perspective view of a bucket insert in a substantially parallel orientation (FIG. 8A) and in a non-parallel or tilted orientation (FIG. 8B) according to another embodiment of the present disclosure.
Figure 8B:
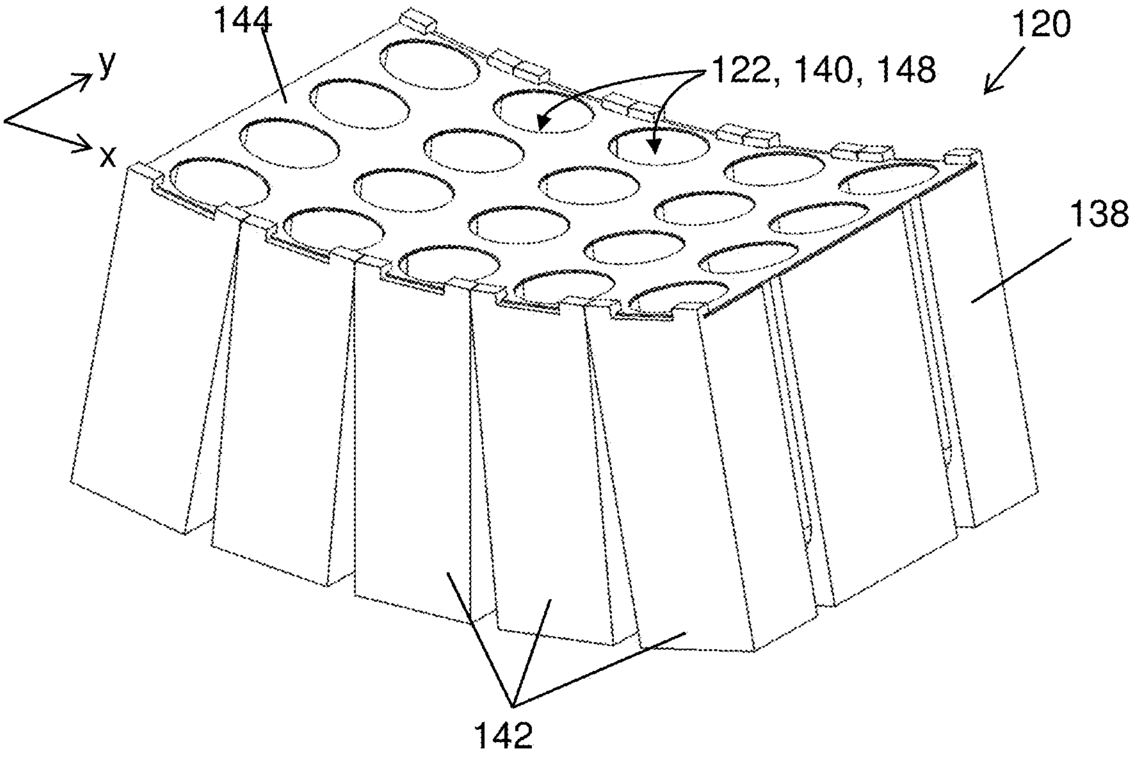

In FIGS. 8A and 8B, a three-dimensional view of an embodiment of the bucket insert 120 of FIGS. 7A and 7B is shown, wherein FIG. 8B corresponds to FIG. 7B and shows the first configuration, in which the tilted orientation is given, and wherein FIG. 8A corresponds to FIG. 7A, showing the second configuration in which the substantially parallel orientation is given. As can be seen, in this example, the elongated receptacles 122 may be arranged in a matrix pattern, such as a rectangular matrix pattern. The body segments 142 may be configured such that a plurality of elongated receptacles can be disposed in each of the body segments 142, in a substantially parallel orientation. Thus, as an example and as is shown in FIGS. 8A and 8B, each of the body segments 142 may comprise four elongated receptacles. The direction of those four elongated receptacles, as an example, may define a column direction or y-direction. A direction substantially perpendicular to this column direction may define a row direction or x-direction. As an example, in the exemplary embodiment shown, five body segments 142 can be oriented in the row direction. When the bucket insert 120 changes its configuration, such as from the first into the second configuration, neighboring elongated receptacles 122 disposed in neighboring body segments 142 or in different body segments 142 may change their relative orientation or may be tilted against each other, whereas elongated receptacles 122 being disposed in the same body segment can remain oriented in a substantially parallel fashion, as can be seen e.g., in FIG. 8B.

The insert body 138 and, specifically, the body segments 142 may be made of a rigid material, such as a rigid plastic material, whereas, as outlined above, the connecting element 144 may be made of a flexible material. As visible e.g. in FIG. 8B, the connecting element 144 may be connected to the body segments 142 by various connection means, specifically by a form-fit connection.

The proposed solution thus may combine a segmented rigid structure of the body segments 142 and the flexible element of the connecting element 144. This combination may allow for positioning and fixing the elongated sample vessels 124 at their respective positions, for orienting the elongated sample vessels 124 in a substantially parallel orientation for loading and unloading, specifically in an automated fashion, and, finally, for aligning the respective longitudinal axes 126 with the centrifugal force vector 132, as shown in FIG. 6, during centrifugation. Therein, one of the configurations shown in the embodiments of FIGS. 8A and 8B or 7A and 7B, respectively, may be a relaxed configuration, in which the connecting element 144 may be in a relaxed state and may, for example, not exert forces onto the body segments 142, and the other configuration, as an example, may be a tension configuration, in which the connecting element 144 is tensioned or biased.

As an example, the first configuration of FIG. 8B may be the relaxed or natural configuration, whereas, in the second configuration of the FIG. 8A, the connecting element 144 may be tensioned. Specifically, in the configuration illustrated in FIGS. 8B and 7B, also referred to as the first configuration, the connecting element 144 may be in a relaxed state and may, for example, have a flat bent shape. The connecting element 144 may be in a tensioned state in the configuration illustrated in FIGS. 8A and 7A, also referred to as the second configuration. Thus, in order to maintain the second configuration, in which the body segments 142 are not spread and in order to prevent the body segments 142 from spreading and from reorienting into the spread orientation of FIG. 8B, a holding force may have to be exerted. As an example, for the body segments 142 to be oriented in the second configuration, e.g., in the non-spread configuration in which the sample vessels 124 may be loaded into the receptacles 122, the bucket insert 120 may has to be inserted into the holding structure 150. By inserting the bucket insert 120 with the body segments 142 into the holding structure 150, a holding force may specifically be exerted onto the connecting element 144. Thus, by inserting the bucket insert 120 into the holding structure, the connecting element 144 may be tensioned. When removing the bucket insert 120 from the holding structure 150, the tensioned connecting element 144 may no longer be held in the tensioned state and may thus cause the bucket insert 120 to change from the second configuration, e.g., as illustrated in FIG. 8A, into the first configuration, e.g., as illustrated in FIG. 8B.

Alternatively, the second configuration of FIG. 8A may be the relaxed or natural configuration and the first configuration of FIG. 8B may be the tensioned configuration. Specifically, as an example, in the configuration illustrated in FIG. 8A, the connecting element 144 may be in a relaxed state and in the configuration illustrated in FIG. 8B, the connecting element 144 may be in a tensioned state. Thus, in the second configuration, the connecting element 144 may have a relaxed planar flat shape. By inserting the bucket insert 120 in the bucket 118 having a spacer element 156, as an example, the bucket insert 120 may be brought into the first configuration thereby exerting a force onto the connecting element 144. Thus, by inserting the bucket insert 120 into the bucket 118, the connecting element 144 may be tensioned. When removing the bucket insert 120 from the bucket 118 having the spacer element 156, the tensioned connecting element 144 may no longer be held in the tensioned state and may thus cause the bucket insert 120 to change from the first configuration, e.g., as illustrated in FIG. 8B, into the second configuration, e.g., as illustrated in FIG. 8A.

Figure 9:
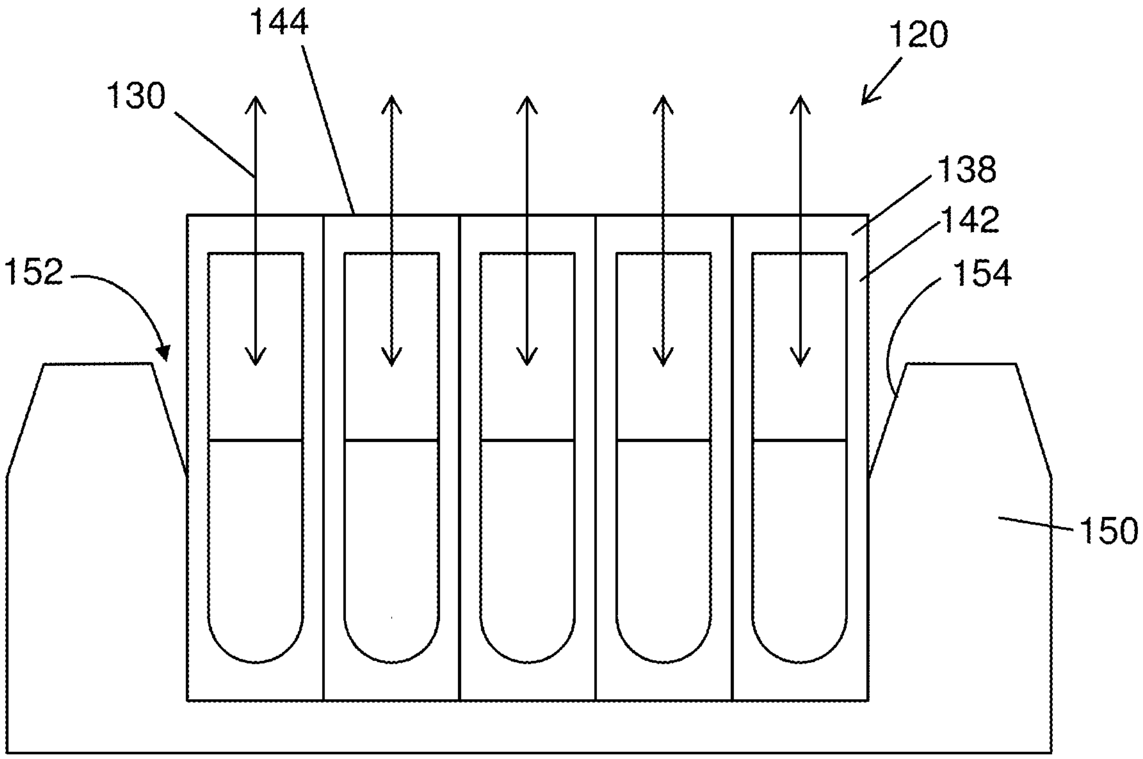
FIG. 9 illustrates the bucket insert of FIGS. 7A and 7B inserted into a holding structure for loading or unloading elongated sample vessels according to an embodiment of the present disclosure.

Thus, as an example, in order to load or unload the bucket insert 120, mechanical methods may be used, such as in a loading and/or unloading area, in which the bucket insert 120 is held in the second configuration. This is shown in an exemplary cross-sectional view in FIG. 9. Thus, FIG. 9 shows a holding structure 150 having a receptacle 152 into which the bucket insert 120 may be loaded, in order to maintain the second configuration, in which the body segments 142 can be oriented in a substantially parallel fashion. For enabling the insertion of the bucket insert 120, an introduction slope 154 may be present. The holding structure 150, as an example, may comprise a rectangular pit, into which the lower side of the insert body 138 of FIG. 8A may be inserted.

Figure 10:
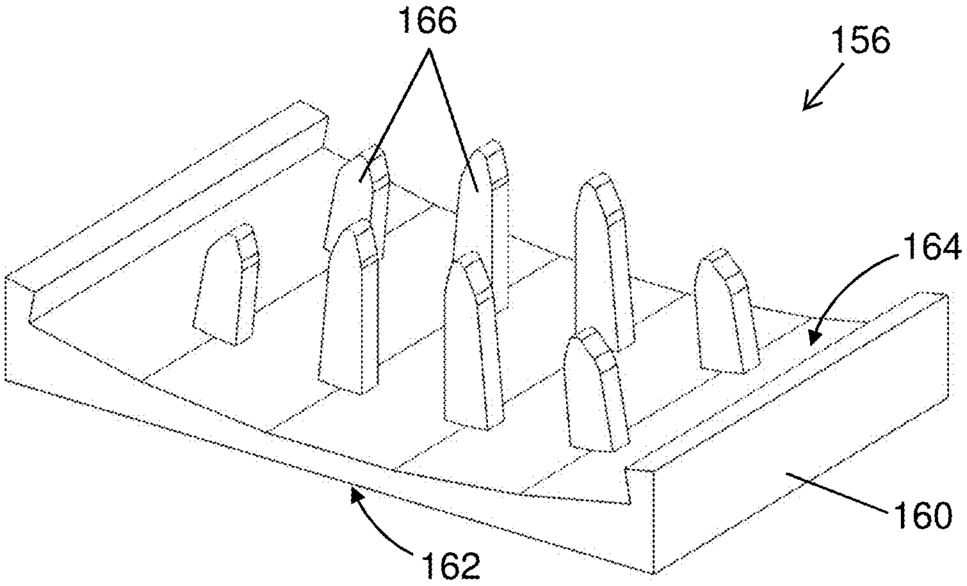
FIG. 10 illustrates a spacer element according to an embodiment of the present disclosure.
Figure 11:
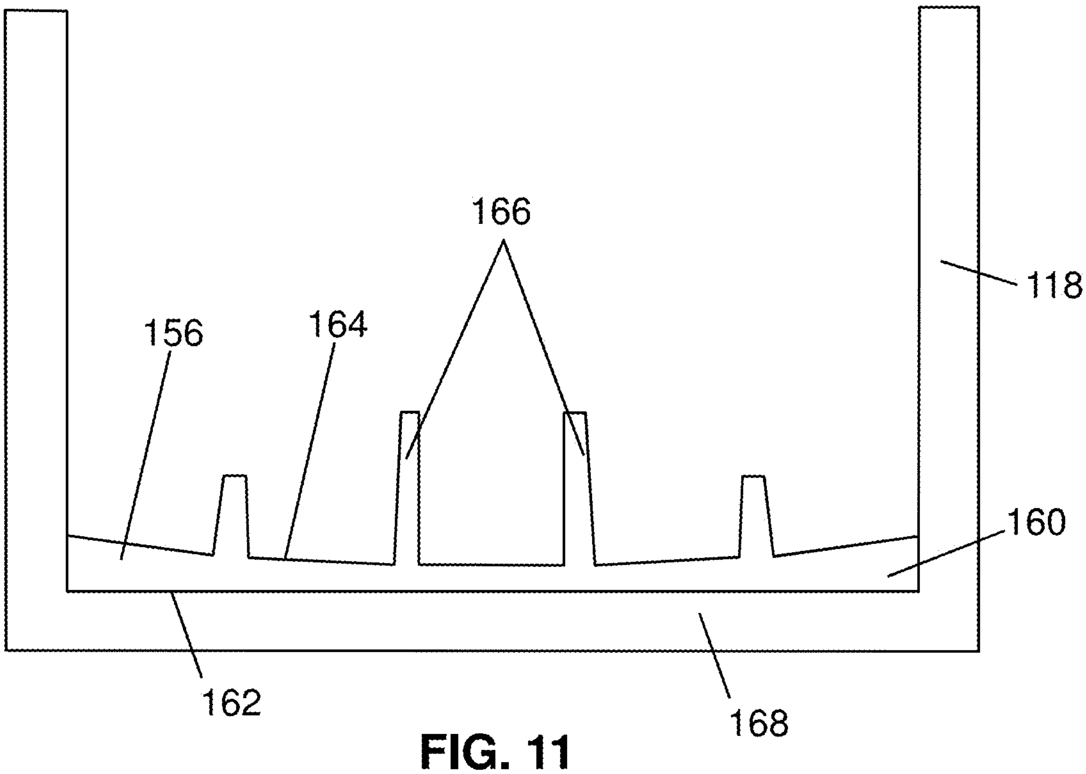
FIG. 11 illustrates a cross-sectional view of a bucket with the spacer element of FIG. 9 disposed therein according to an embodiment of the present disclosure.
Figure 12:
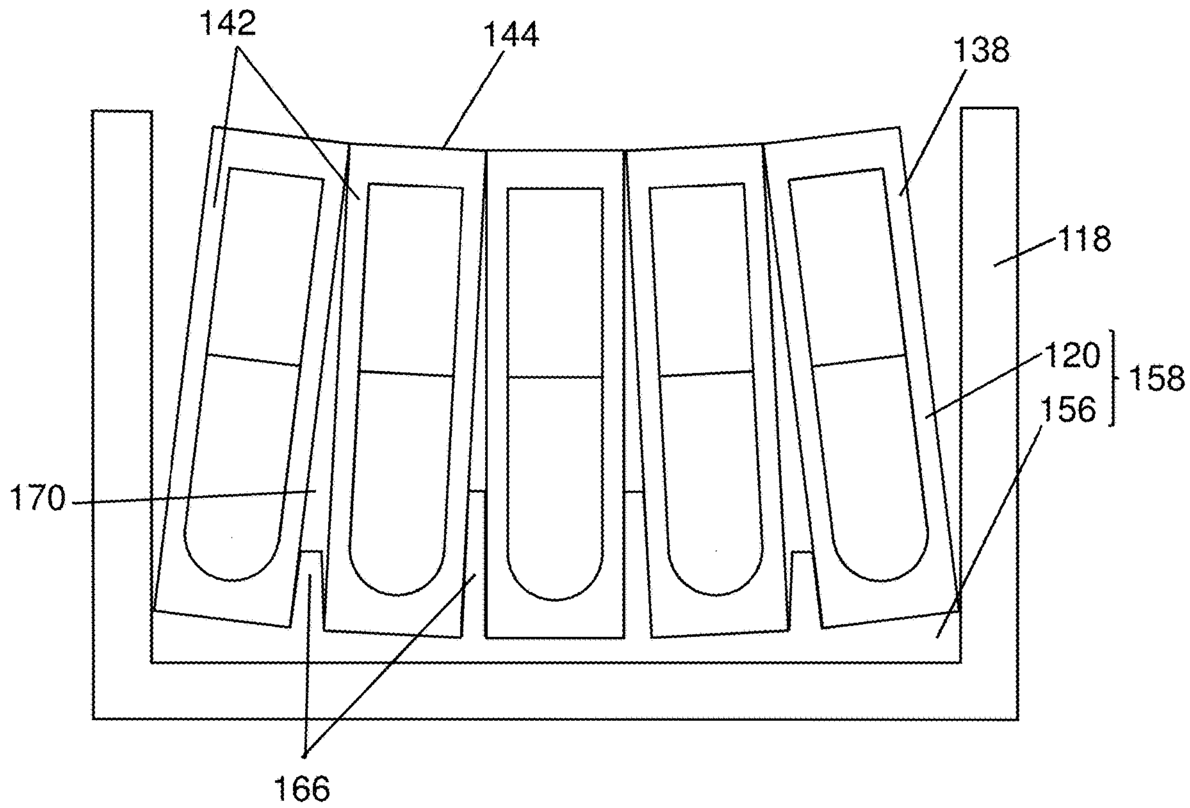
FIG. 12 illustrates a cross-sectional view of a bucket insert kit comprising a bucket insert and the spacer element of FIG. 11 according to an embodiment of the present disclosure.
Figure 13A:
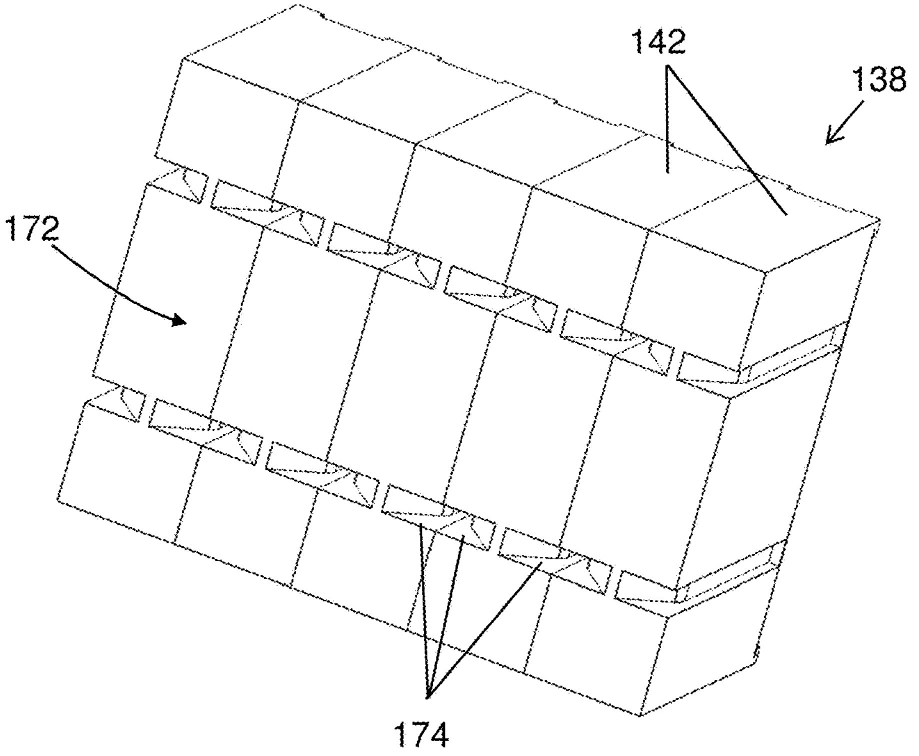
FIGS. 13A-B illustrate three-dimensional views of a lower side of the bucket insert in a substantially parallel configuration (FIG. 13A) and in a tilted orientation (FIG. 13B) according to an embodiment of the present disclosure.
Figure 13B:
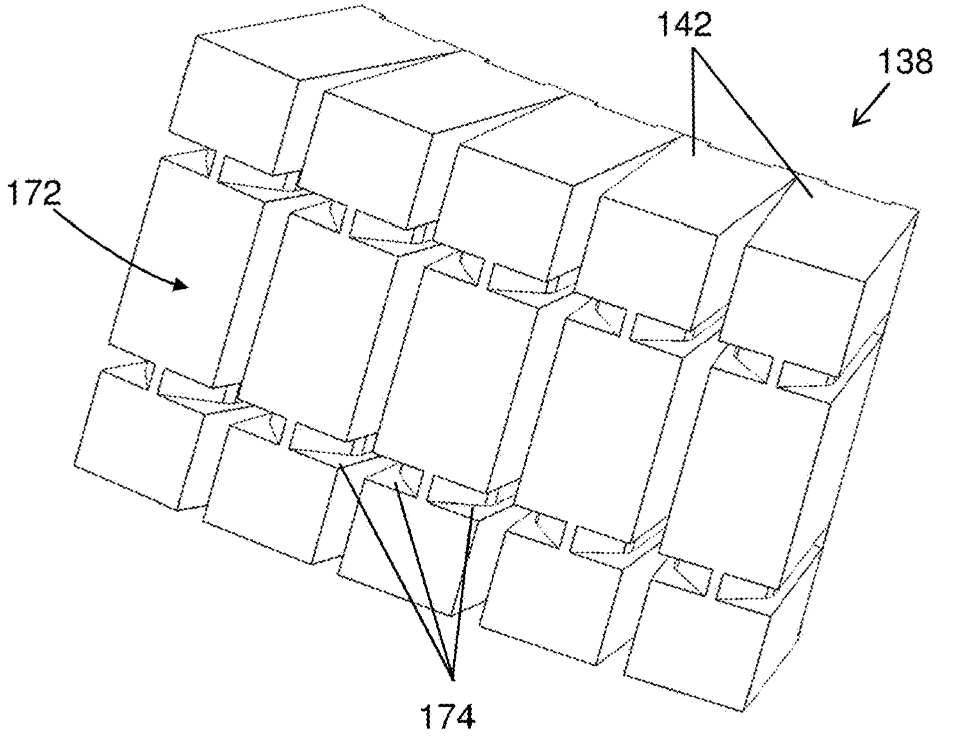

After loading, the bucket insert 120 may be inserted into the bucket 118 of the centrifuge 110. When inserted into the centrifuge 110, the bucket insert 120 can be precisely spread to properly align the axes 126 of the elongated sample vessels 124 with the centrifugal force vector 132. For this purpose and for maintaining the tilted orientation, a spacer element 156 may be used, as will be shown in the context of FIGS. 10-13. Thus, FIG. 10 shows a perspective view of a spacer element 156, FIG. 11 shows a cross-sectional view through a bucket 118 having a spacer element 156 disposed therein, FIG. 12 shows a cross-sectional view of a bucket insert kit 158 comprising a bucket insert 120 and the spacer element 156, the bucket insert kit 158 being disposed in a bucket 118, and FIGS. 13A and 13B showing three-dimensional views of a lower side of the bucket insert 120 in the second and first configurations, respectively. These Figures, in the following, will be explained in conjunction.

Thus, as can be seen in FIG. 10, the spacer element 156 may comprise a base 160 having a flat lower side 162 and a curved upper side 164. On the curved upper side 164, a plurality of wedge-shaped protrusions 166 may protrude from the surface of the spacer element 160. With its flat lower side 162, the spacer element 160 may be disposed against a bottom wall 168 of bucket 118, as can be seen in FIG. 11. When the bucket insert 120, such as described in the embodiment of FIGS. 8A and 8B, is inserted into the bucket 118, the protrusions 166 protrude into interspaces 170 in between the body segments 142 of the insert body 138, thereby maintaining the tilted orientation shown in FIG. 8B, as visible in FIG. 12.

In order to support an interaction between the protrusions 166 of the spacer element 156 and the insert body 138, the body segments 142, at a lower side 172 of the insert body 138, may comprise a plurality of spacer openings 174. This is shown in a perspective view in FIGS. 13A and 13B, in which the lower side 172 of the insert body 138 is visible. As can be seen, the spacer openings 174 can be arranged such that, when the wedge-shaped protrusions 166 are forced into the spacer openings 174, such as by inserting the bucket insert 120 into the bucket 118, neighboring body segments 142 can be spread, thereby reorienting the bucket insert 120 into the tilted orientation, e.g., by a reorienting the bucket insert 120 into the configuration in which the elongated sample vessels 124 and/or the elongated receptacles 122 can be oriented in the tilted orientation. This setup can enable a precise spreading of the bucket insert 120 while inserting it into the bucket 118. Instead of spacer openings, other structures for interacting with the spacer element 156 may be used alternatively or in addition.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A bucket insert for use in a centrifuge, the bucket insert comprising:

an insert body, the insert body comprising a plurality of elongated receptacles for receiving elongated sample vessels, wherein the elongated receptacles have a length that is equal or greater than the length of the elongated sample vessels, wherein the bucket insert is configured for orienting the elongated sample vessels in a tilted orientation, wherein in the tilted orientation, at least some of the elongated sample vessels are oriented in a non-parallel fashion, wherein the bucket insert is configured for orienting the elongated sample vessels in a parallel orientation, wherein in the parallel orientation the elongated sample vessels are oriented in a parallel fashion, wherein the bucket insert is at least partially flexibly deformable, and wherein the bucket insert is configured for re-orienting the elongated sample vessels from the tilted orientation into the parallel orientation and/or vice versa by deformation of the insert body.

2. The bucket insert according to claim 1, wherein, in the tilted orientation, the elongated sample vessels are axially oriented towards a common rotational axis.

3. The bucket insert according to claim 1, wherein the insert body comprises a plurality of body segments, wherein each body segment comprises at least one of the elongated receptacles.

4. The bucket insert according to claim 3, wherein the body segments are tiltable about at least one tilting axis such that at least two of the body segments are tiltable with respect to each other.

5. The bucket insert according to claim 3, wherein the insert body comprises at least one connecting element, the connecting element connecting the body segments.

6. The bucket insert according to claim 5, wherein the connecting element has a flat shape, wherein the body segments are attached to a surface of the connecting element.

7. The bucket insert according to claim 5, wherein the connecting element is deformable.

8. A bucket insert kit for use in a centrifuge, the bucket insert kit comprising:

at least one bucket insert according to claim 1; and at least one spacer element, the spacer element being configured for holding the bucket insert in a configuration in which the elongated sample vessels and/or the elongated receptacles are oriented in the tilted orientation.

9. A bucket kit for use in a centrifuge, the bucket kit comprising:

at least one bucket insert according to claim 1; and at least one bucket, wherein the bucket insert is insertable into the bucket.

10. The bucket kit according to the claim 9, further comprising, at least one spacer element, the spacer element being insertable into the bucket or fixed in the bucket, the spacer element configured to hold the bucket insert within the bucket in a configuration in which the elongated sample vessels and/or the elongated receptacles are oriented in the tilted orientation.

11. A centrifuge, the centrifuge comprising:

at least one bucket kit according to claim 9;

at least one rotor for rotating the bucket kit about at least one rotational axis.

12. A method of centrifuging, the method comprising:

providing a plurality of elongated sample vessels;

providing at least one bucket insert according to claim 1;

receiving the elongated sample vessels in the elongated receptacles;

orienting the bucket insert in the tilted orientation, wherein in the tilted orientation at least some of the elongated sample vessels are oriented in a non-parallel fashion;

receiving the bucket insert in at least one bucket of a centrifuge; and rotating the bucket about a rotational axis of the centrifuge, wherein the elongated sample vessels, during rotation, are axially oriented towards the rotational axis.

* * * * *